(12) United States Patent
Harriman

(10) Patent No.: US 12,440,948 B2
(45) Date of Patent: Oct. 14, 2025

(54) ADJUSTABLE HOLDER ASSEMBLY

(71) Applicant: Harrco Industries LLC, Boston, MA (US)

(72) Inventor: Michael J. Harriman, Sturbridge, MA (US)

(73) Assignee: HARRCO INDUSTRIES LLC, Boston, MA (US)

( * ) Notice: Subject to any disclaimer, the term of this patent is extended or adjusted under 35 U.S.C. 154(b) by 314 days.

(21) Appl. No.: 18/165,030

(22) Filed: Feb. 6, 2023

(65) Prior Publication Data

US 2023/0294252 A1    Sep. 21, 2023

Related U.S. Application Data

(60) Provisional application No. 63/306,558, filed on Feb. 4, 2022.

(51) Int. Cl.
 *B25B 11/00*   (2006.01)
 *B25B 11/02*   (2006.01)

(52) U.S. Cl.
 CPC ............ *B25B 11/02* (2013.01); *B25B 11/002* (2013.01)

(58) Field of Classification Search
 CPC ....... B25B 11/00; B25B 11/02; B25B 11/002; B23Q 3/00; B23Q 3/06; B23Q 3/061; B23Q 3/066
 See application file for complete search history.

(56) References Cited

U.S. PATENT DOCUMENTS

| | | | | |
|---|---|---|---|---|
| 4,901,418 A * | 2/1990 | Machado | ............... | A63B 53/02 29/266 |
| 5,785,305 A * | 7/1998 | Stalker | ...................... | B25B 5/14 269/37 |
| 5,839,181 A * | 11/1998 | Chu | ........................ | A63B 60/00 29/283 |
| 8,393,605 B2 * | 3/2013 | Yang | ........................ | B25B 5/12 269/287 |
| 8,517,361 B2 * | 8/2013 | Sambuceto | ............. | B25B 5/003 269/37 |
| 8,523,156 B2 * | 9/2013 | Hou | .......................... | B25B 5/10 269/37 |
| 2023/0294252 A1 * | 9/2023 | Harriman | .............. | B25B 11/002 269/8 |

* cited by examiner

*Primary Examiner* — Lee D Wilson

(74) *Attorney, Agent, or Firm* — Brian J. Colandreo; Jeffrey T. Placker; Holland & Knight LLP

(57) ABSTRACT

An adjustable holder assembly configured for temporarily positioning an object on a surface includes: a base assembly configured to be temporarily affixed to the surface; a support assembly configured to be slidably displaceable with respect to the base assembly and configured to support the object proximate the surface; and an angle defining assembly configured to adjust the angular position of the object with respect to the surface.

22 Claims, 11 Drawing Sheets

ADJUSTABLE HOLDER ASSEMBLY

RELATED CASE(S)

This application claims the benefit of U.S. Provisional Application No. 63/306,558 filed on 4 Feb. 2022, the contents of which are incorporated herein by reference.

TECHNICAL FIELD

This disclosure relates to holder assemblies in general and, more particularly, to adjustable holder assemblies.

BACKGROUND

Oftentimes, a one person job requires two people simply because a second person is needed to temporarily hold something in place while another firmly affixes the object. Examples of such objects may include a length of molding; a length of chair rail; a length of railing; a door assembly; and a window assembly. Unfortunately, such situations either delay completion time or drive up production costs, neither of which are desirable to the end user.

SUMMARY OF DISCLOSURE

In one implementation, an adjustable holder assembly configured for temporarily positioning an object on a surface includes: a base assembly configured to be temporarily affixed to the surface; a support assembly configured to be slidably displaceable with respect to the base assembly and configured to support the object proximate the surface; and an angle defining assembly configured to adjust the angular position of the object with respect to the surface.

One or more of the following features may be included. The angle defining assembly may be angularly and/or slidably displaceable with respect to the support assembly. An adjustment system may be configured to slidably displace the support assembly with respect to the base assembly. The adjustment system may include a micrometer-type adjustment system. An angle indicator may be configured to indicate the angular position of the object with respect to the surface. The angle indicator may include a protractor assembly. The angle indicator may include one or more detents at common angles. An inclination indicator may be configured to indicate the level/plumb orientation of the adjustable holder assembly. The inclination indicator may include a bubble level. A laser alignment assembly may be configured to enable aligning of the adjustable holder assembly with an external assembly. A magnetic gripper assembly may be configured to removeably couple a hook of a tape measure to the adjustable holder assembly. The adjustable holder assembly may be constructed of a metallic material. The adjustable holder assembly may be constructed of a plastic material. The object being temporarily positioned on the surface may include one of more of: a length of molding; a length of chair rail; a length of railing; a door assembly; and a window assembly.

In another implementation, an adjustable holder assembly configured for temporarily positioning an object on a surface includes: a base assembly configured to be temporarily affixed to the surface; a support assembly configured to be slidably displaceable with respect to the base assembly and configured to support the object proximate the surface; and an angle defining assembly configured to adjust the angular position of the object with respect to the surface, wherein the angle defining assembly is angularly and/or slidably displaceable with respect to the support assembly.

One or more of the following features may be included. An adjustment system may be configured to slidably displace the support assembly with respect to the base assembly. An angle indicator may be configured to indicate the angular position of the object with respect to the surface. An inclination indicator may be configured to indicate the level/plumb orientation of the adjustable holder assembly. A laser alignment assembly may be configured to enable aligning of the adjustable holder assembly with an external assembly. A magnetic gripper assembly may be configured to removeably couple a hook of a tape measure to the adjustable holder assembly.

In another implementation, an adjustable holder assembly configured for temporarily positioning an object on a surface includes: a base assembly configured to be temporarily affixed to the surface; a support assembly configured to be slidably displaceable with respect to the base assembly and configured to support the object proximate the surface; an angle defining assembly configured to adjust the angular position of the object with respect to the surface, wherein the angle defining assembly is configured to be angularly and/or slidably displaceable with respect to the support assembly; an adjustment system configured to slidably displace the support assembly with respect to the base assembly; and an angle indicator configured to indicate the angular position of the object with respect to the surface.

One or more of the following features may be included. An inclination indicator may be configured to indicate the level/plumb orientation of the adjustable holder assembly. A laser alignment assembly may be configured to enable aligning of the adjustable holder assembly with an external assembly. A magnetic gripper assembly may be configured to removeably couple a hook of a tape measure to the adjustable holder assembly.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
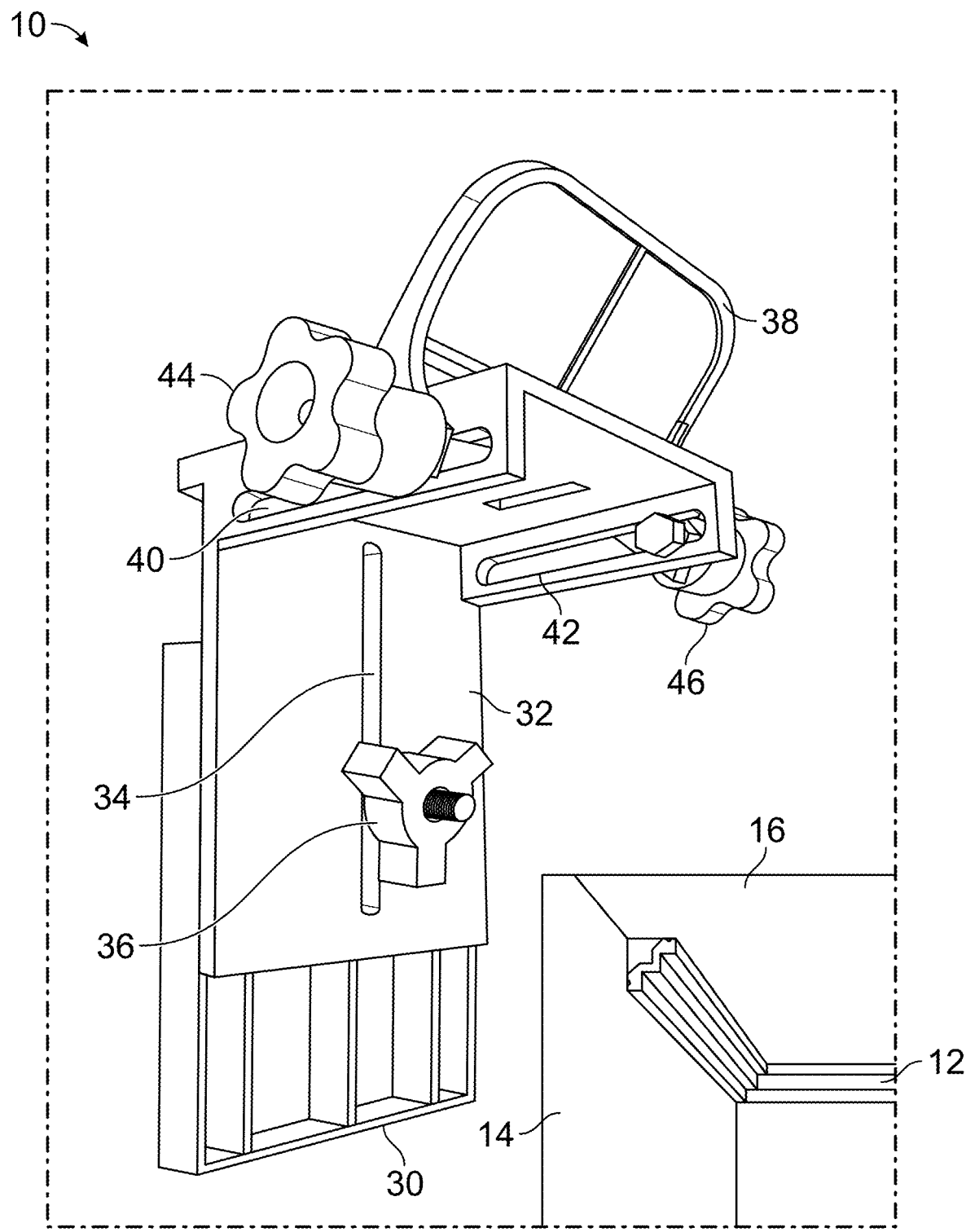
FIG. 1 is a perspective view of an adjustable holder assembly in accordance with various embodiments of the present disclosure.
Figure 2:
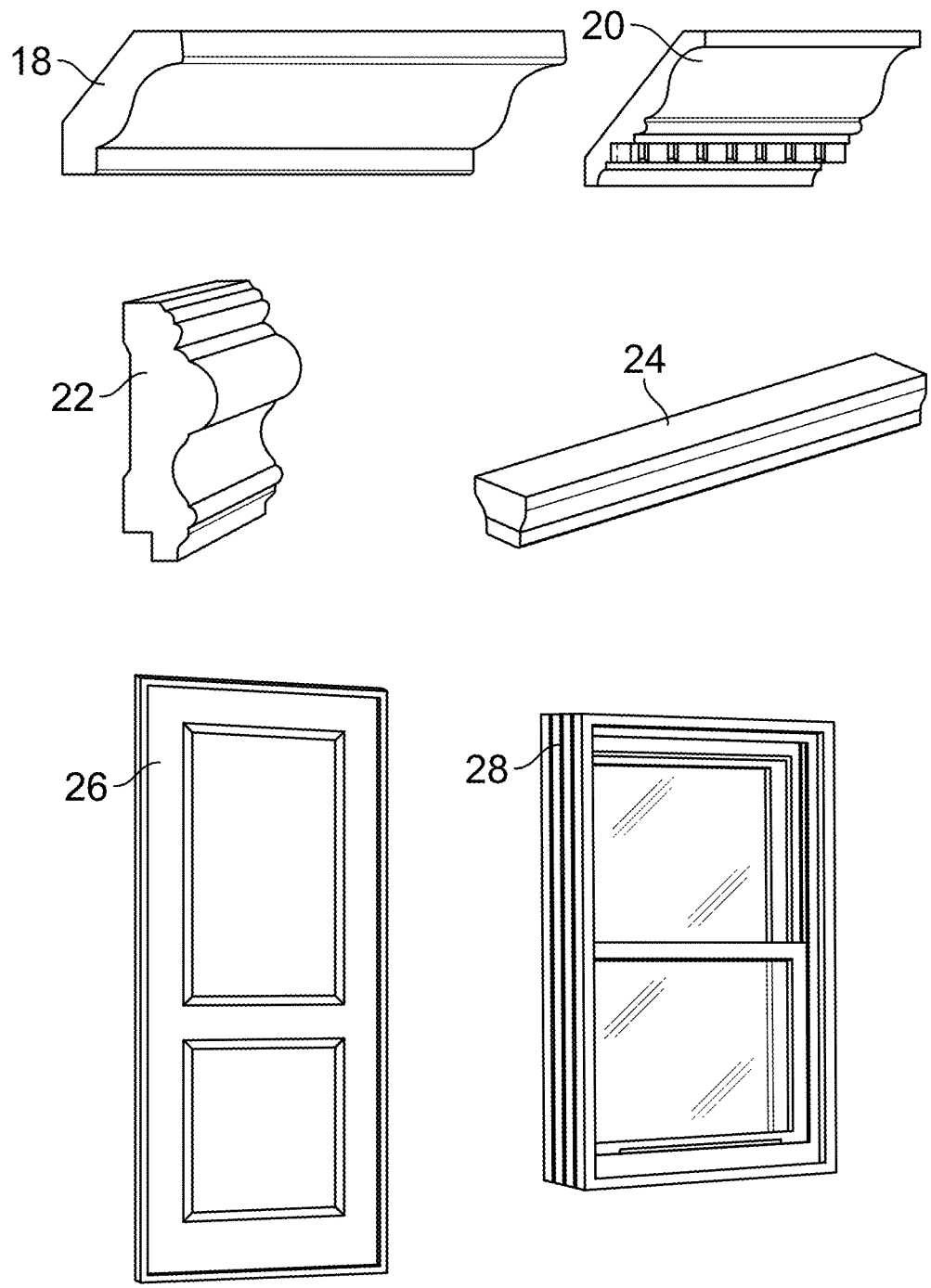
FIG. 2 is a diagrammatic view of various objects with which the adjustable holder assembly of FIG. 1 may be used.
Figure 3:
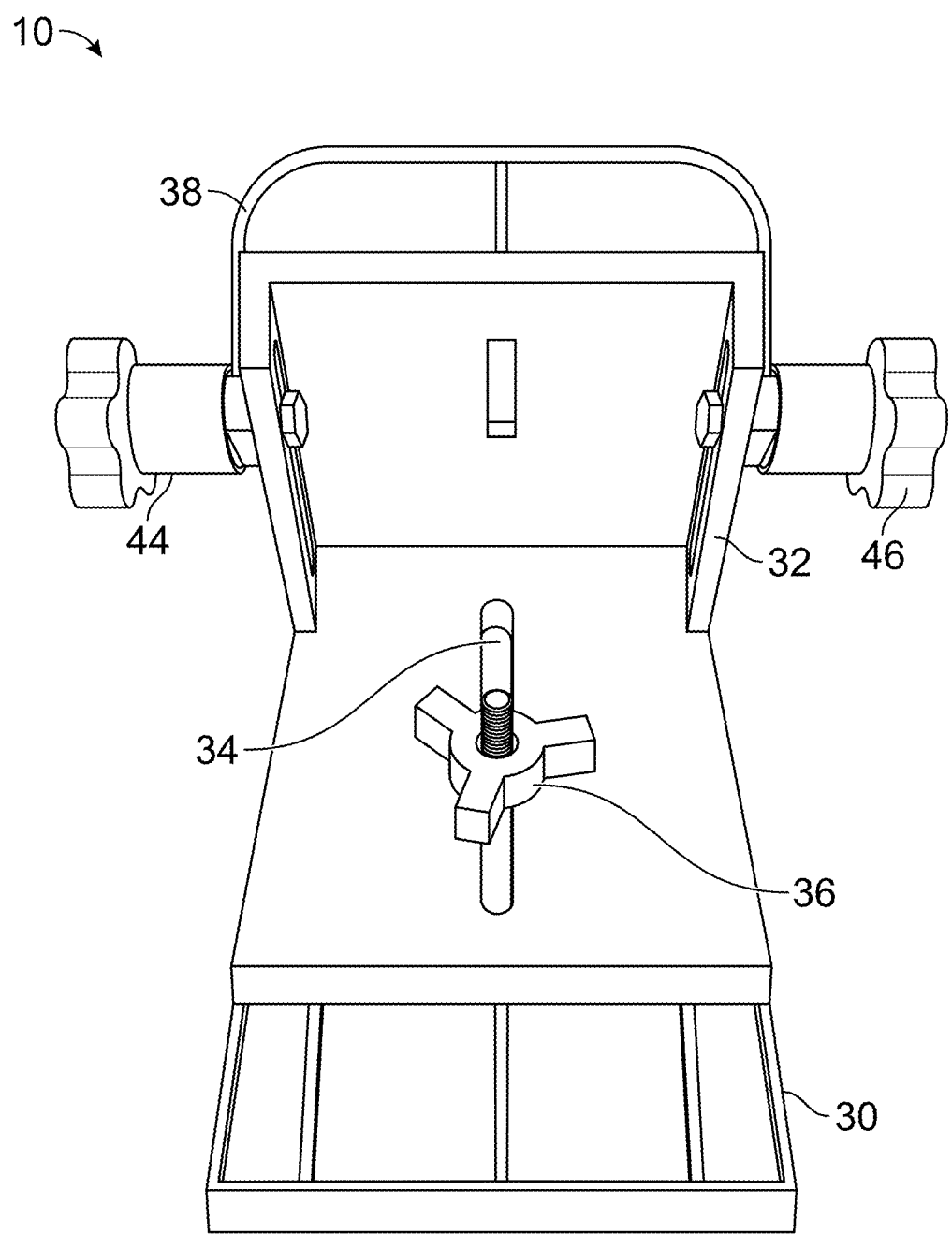
FIGS. 3-10 are additional perspective views of the adjustable holder assembly of FIG. 1 in accordance with various embodiments of the present disclosure.
Figure 4:
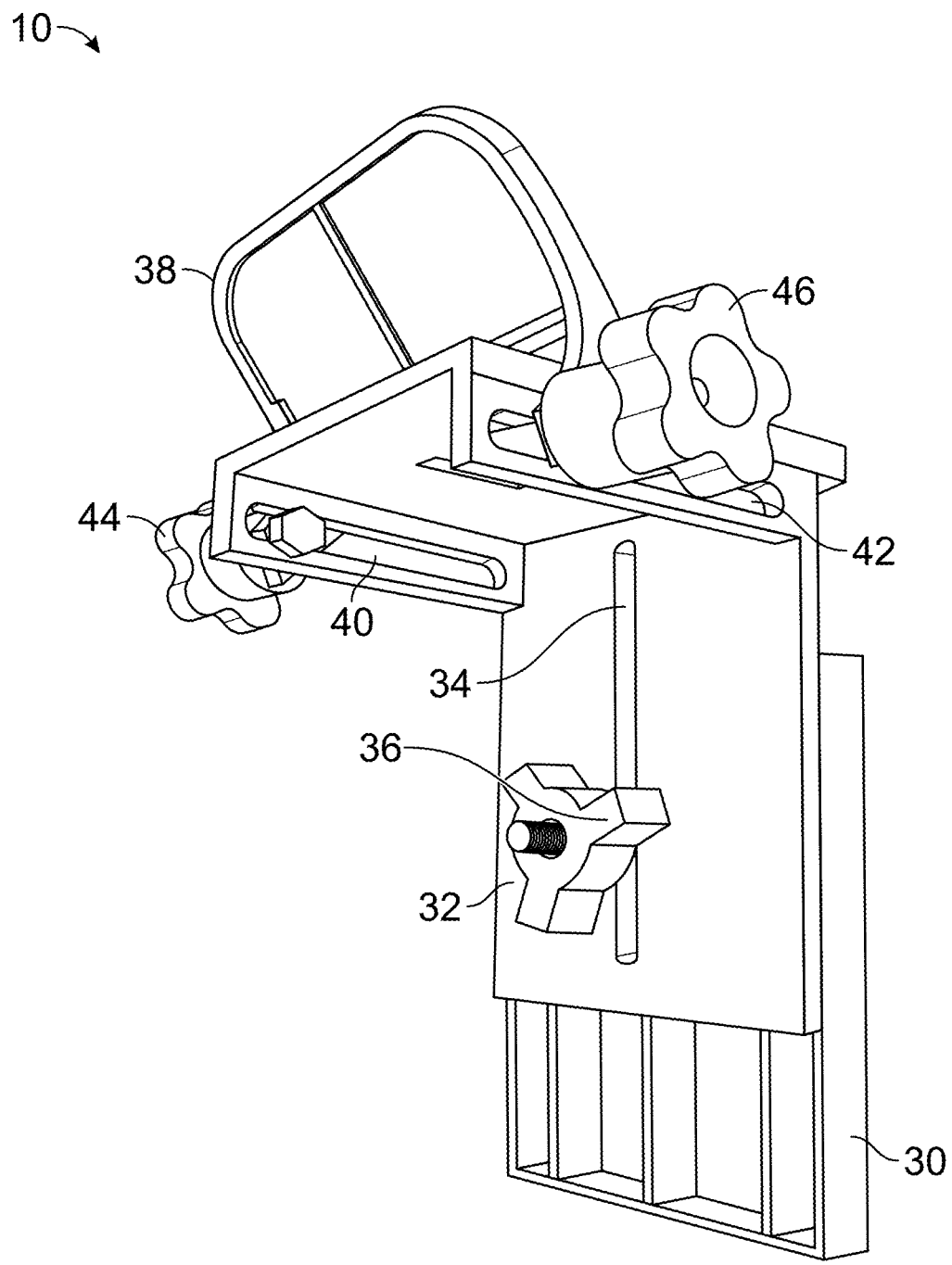
Figure 5:
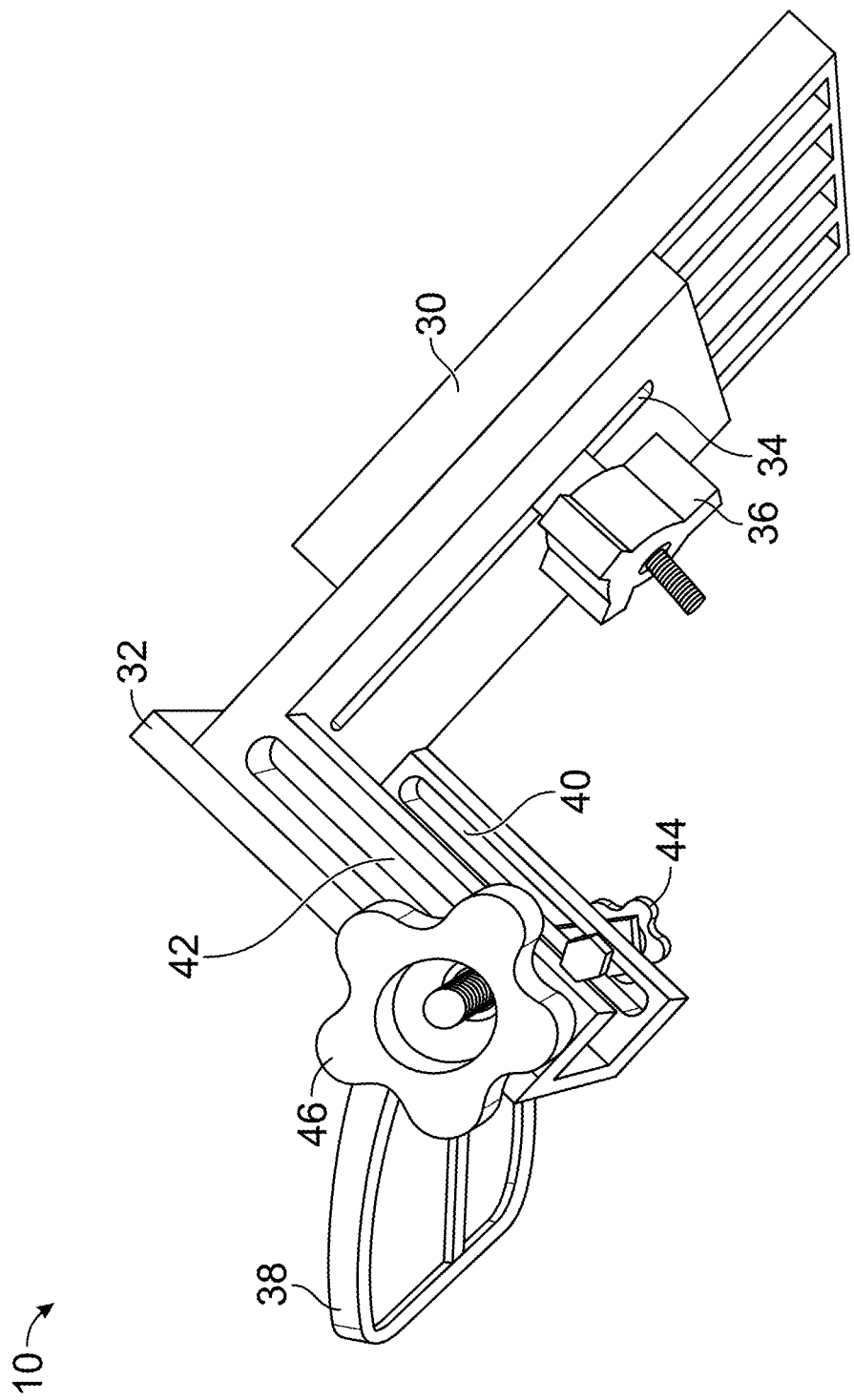
Figure 6:
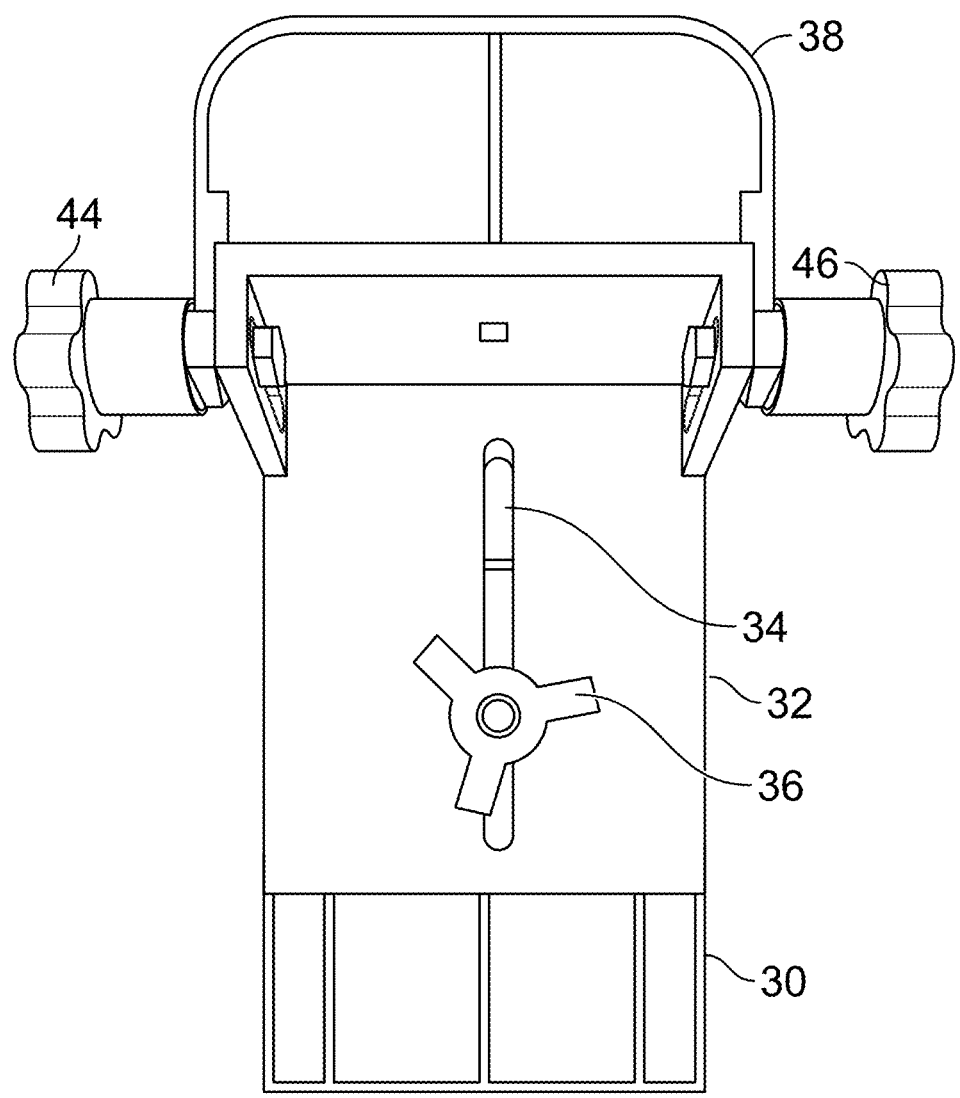

System Overview:

Referring to FIGS. 1-2, there is shown an adjustable holder assembly (e.g., adjustable holder assembly 10) configured for temporarily positioning an object (e.g., object 12) on a surface (e.g., interior wall 14, interior ceiling 16, an exterior wall/ceiling (not shown) and/or a vertical/horizontal surface (not shown). Examples of the object (e.g., object 12)

being temporarily positioned on the surface (e.g., surface 14, 16) may include but are not limited to: a length of molding (e.g., crown molding 18, dentil molding 20); length of chair rail 22; length of railing 24; a door assembly (e.g., prehung door assembly 26); and a window assembly (e.g., prehung window assembly 28).

Through the use of adjustable holder assembly 10, a single person (e.g., one carpenter) may perform a task that often required a team of two people, such as hanging a 12 foot piece of crown molding. Specifically and to perform such a task, one person would often need to hold the crown molding in position (e.g., against the wall and the ceiling) while another person would need to nail the crown molding into place. According, a single person may utilize adjustable holder assembly 10 to temporarily position object 12 (e.g., crown molding 18) on surface 14 (e.g., the intersection of interior wall 14 and interior ceiling 16), thus enabling a single person to perform a task that typically required two people.

Referring also to FIGS. 3-10, adjustable holder assembly (e.g., adjustable holder assembly 10) may be constructed of various materials, examples of which may include but are not limited to: a metallic material (e.g., aluminum), a plastic material (e.g., PVC, ABS, polycarbonate, nylon) and/or a composite material (e.g., carbon fiber composite, fiberglass composite, aramid composite).

The adjustable holder assembly (e.g., adjustable holder assembly 10) may include a base assembly (e.g., base assembly 30) configured to be temporarily affixed to the surface (e.g., surface 14, 16). For example, base assembly 30 may be temporarily affixed to surface 14, 16 using one or more screws (e.g., drywall screws; not shown) that pass through base assembly 30 or one or more adhesive strips (e.g., Command Strips to not shown) applied to a rear surface of base assembly 30.

Adjustable holder assembly (e.g., adjustable holder assembly 10) may include a support assembly (e.g., support assembly 32) configured to be slidably displaceable with respect to the base assembly (e.g., base assembly 30) and configured to support the object (e.g., object 12) proximate the surface (e.g., surface 14, 16). For example, support assembly 32 may include one or more slot assemblies (e.g., slot assembly 34) that, when combined within locking knob 36, may allow support assembly 32 to be slidably displaceable with respect to base assembly 30. Further, support assembly 32 may be configured to pivot with respect to base assembly 30 (as shown in FIG. 11).

Figure 7:
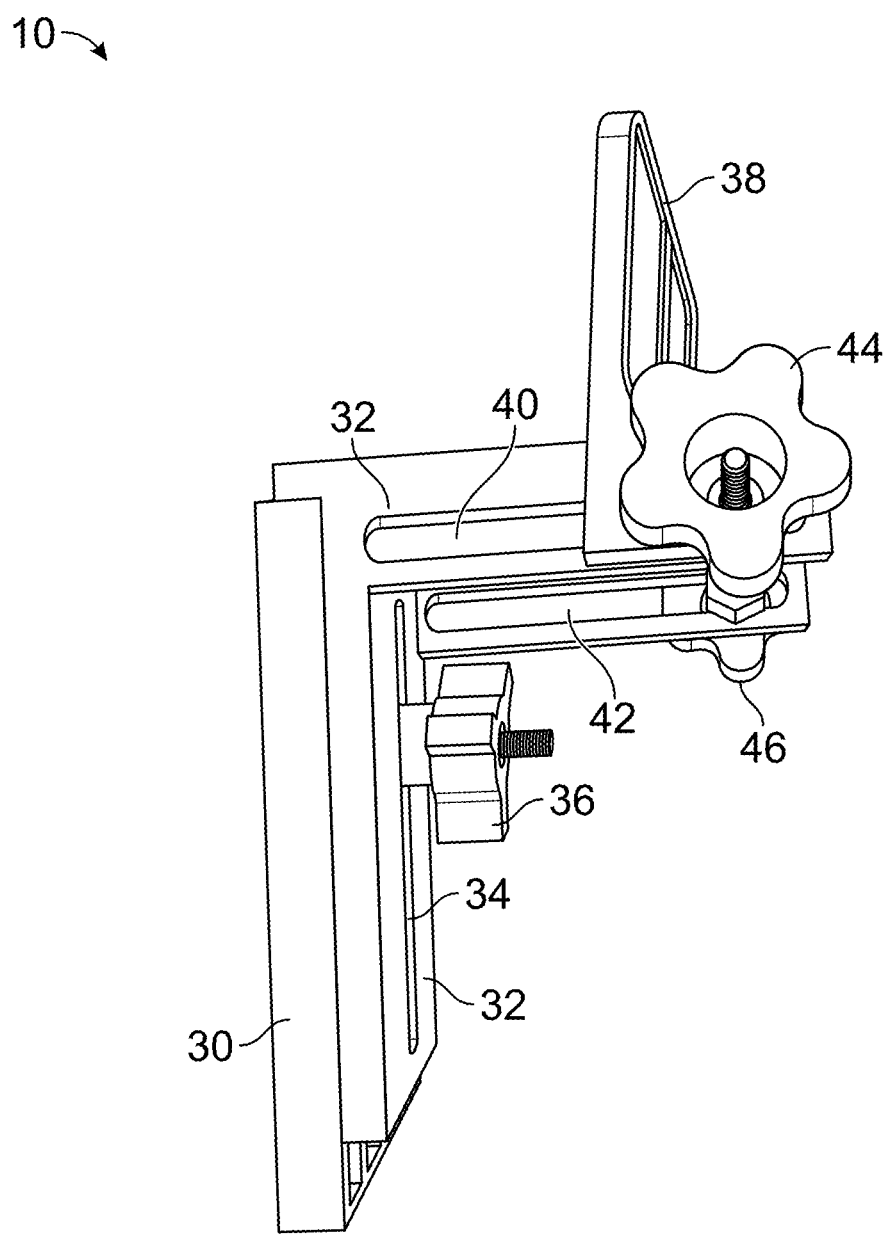
Figure 8:
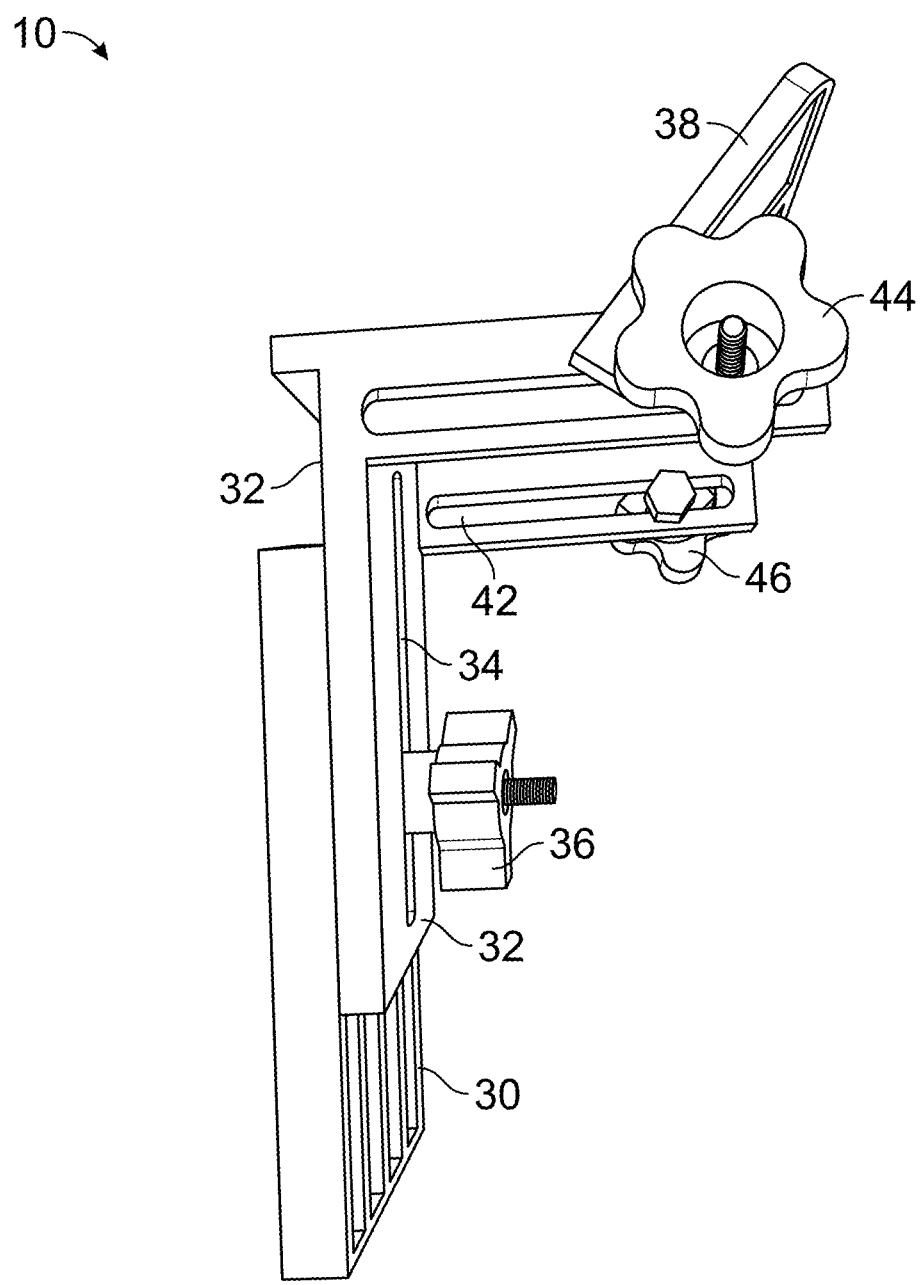
Figure 9:
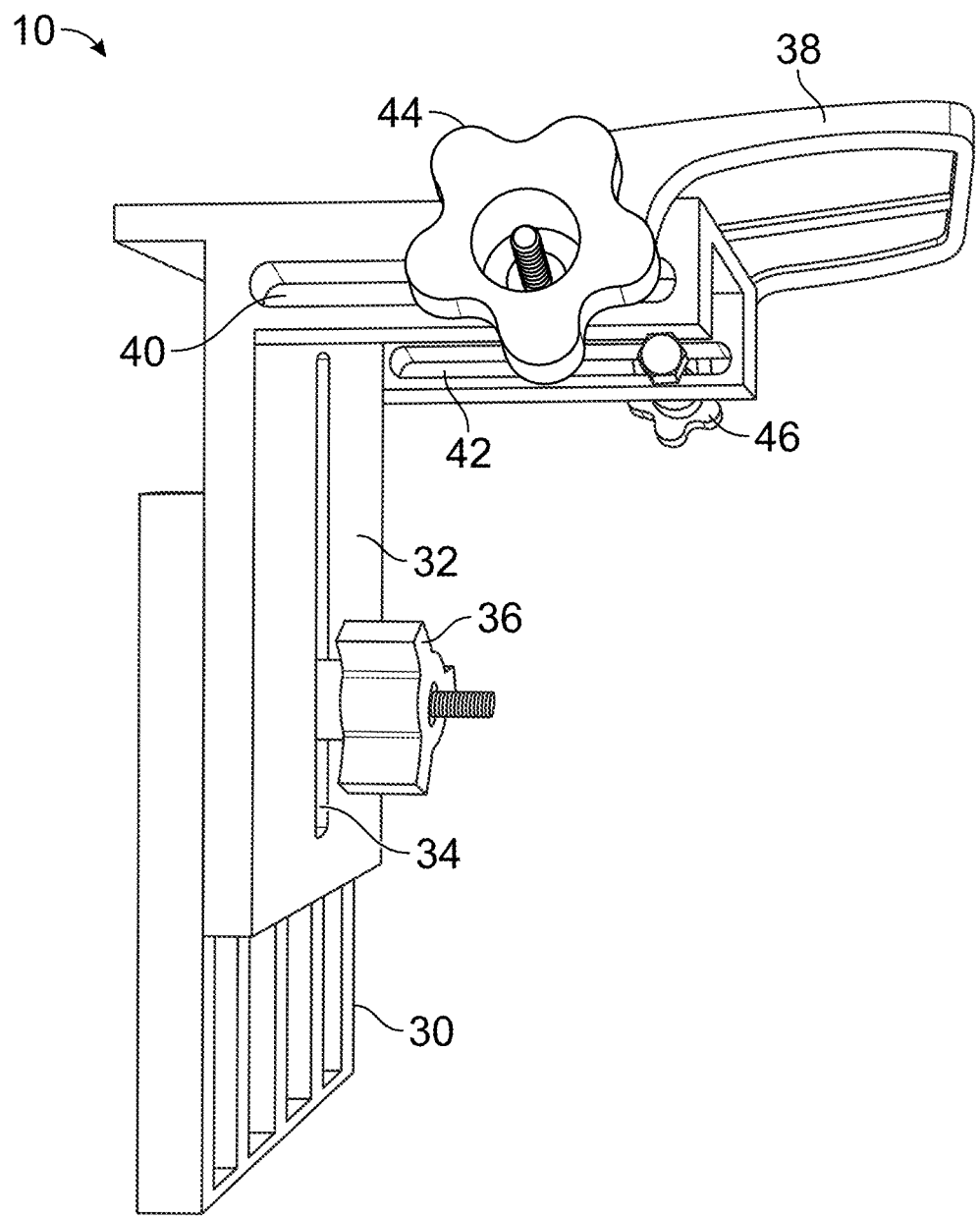
Figure 10:
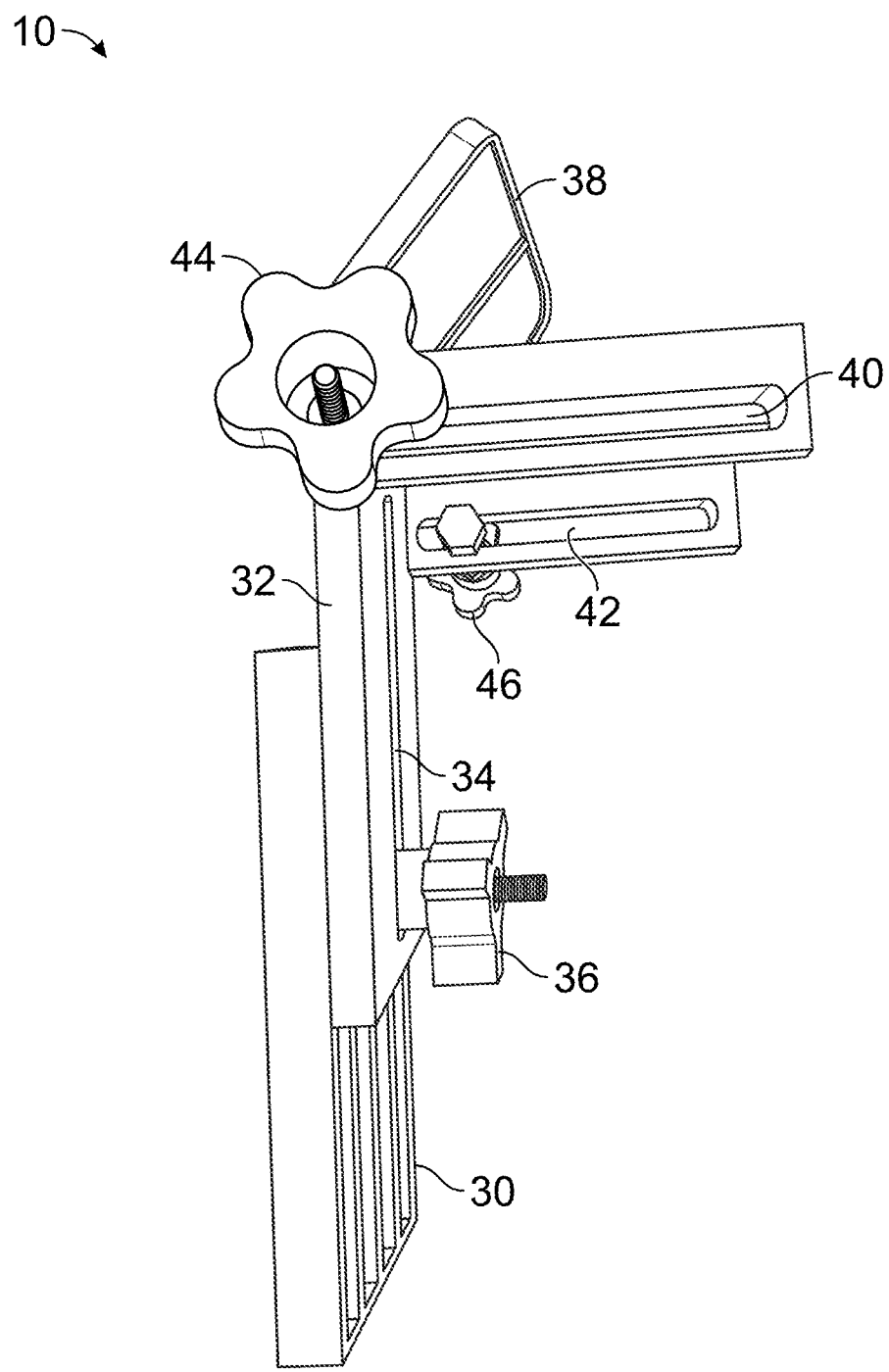

Adjustable holder assembly (e.g., adjustable holder assembly 10) may include an angle defining assembly (e.g., angle defining assembly 38) configured to adjust the angular position of the object (e.g., object 12) with respect to the surface (e.g., surface 14, 16). The angle defining assembly (e.g., angle defining assembly 38) may be angularly and/or slidably displaceable with respect to the support assembly (e.g., support assembly 32). For example, support assembly 32 may include one or more slot assemblies (e.g., slot assemblies 40, 42) that, when combined within locking knobs 44, 46, may allow angle defining assembly 38 to be slidably displaceable with respect to support assembly 32. Further, adjustable holder assembly 10 may be configured to pivot (e.g., about locking knobs 44, 46), thus enabling adjustable holder assembly 10 to pivot with respect to support assembly 32 so that various angles between angle defining assembly 38 and support assembly 32 may be defined. For example, a 45° angle (as shown in FIGS. 1, 3-6, 8 & 10), a 90° angle (as shown in FIG. 7) and a 0° angle (as shown in FIG. 9).

Figure 11:
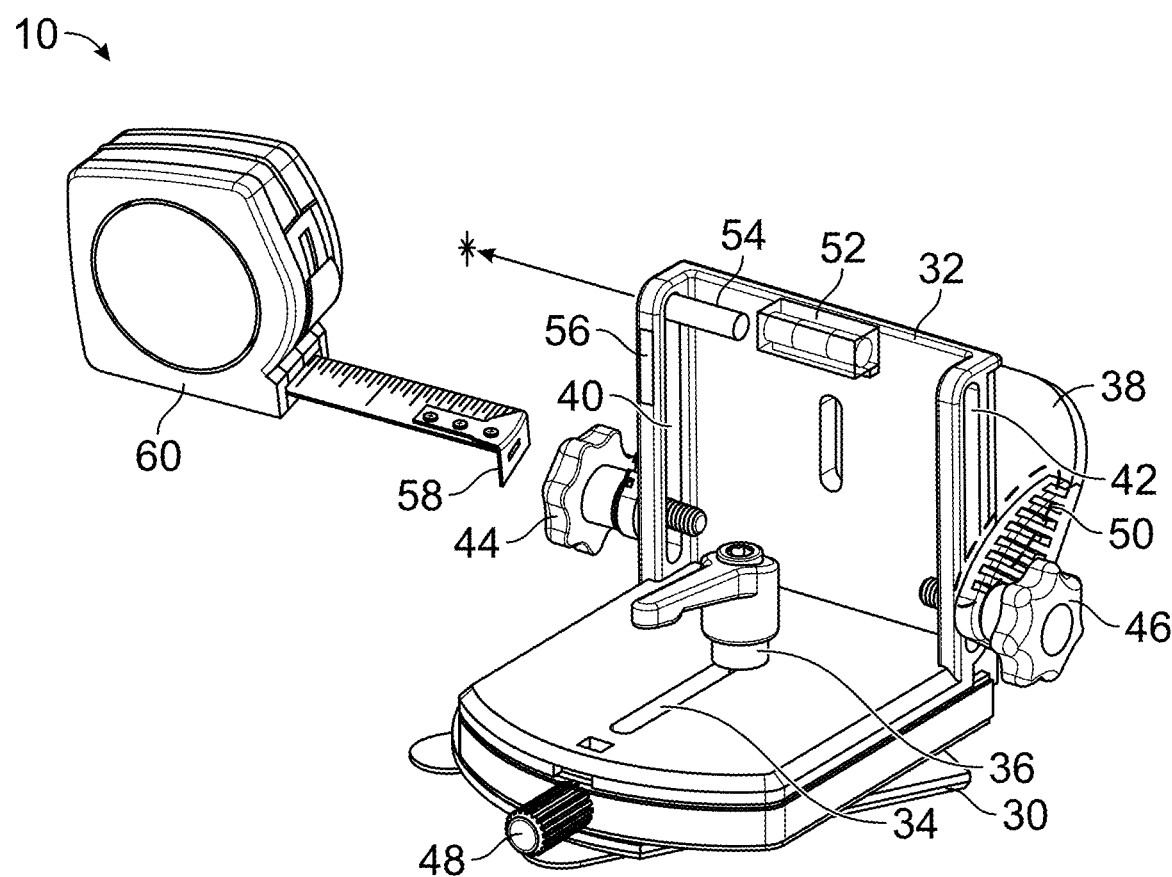
FIG. 11 is an alternative embodiment of the adjustable holder assembly of FIG. 1 in accordance with various embodiments of the present disclosure.

Referring also to FIG. 11, an adjustment system (e.g., adjustment system 48) may be configured to slidably displace the support assembly (e.g., support assembly 32) with respect to the base assembly (e.g., base assembly 28). An example of such an adjustment system (e.g., adjustment system 48) may include but is not limited to a micrometer-type adjustment system (to provide a higher level of accuracy/granularity).

An angle indicator (e.g., angle indicator 50) may be configured to indicate the angular position of the object (e.g., object 12) with respect to the surface (e.g., surface 14, 16). An example of such an angle indicator (e.g., angle indicator 50) may include but is not limited to a protractor assembly. The angle indicator (e.g., angle indicator 50) may include one or more detents at common angles (e.g., 0°, 22.5°, 45°, 67.5°, 90°).

An inclination indicator (e.g., inclination indicator 52) may be configured to indicate the level/plumb orientation of the adjustable holder assembly (e.g., adjustable holder assembly 10). For example, inclination indicator 52 may be incorporated into support assembly 32, thus allowing inclination indicator 52 to indicate the level/plumb orientation of adjustable holder assembly 10 generally and support assembly 32 specifically. An example of the inclination indicator (e.g., inclination indicator 52) may include but is not limited to a bubble level.

Adjustable holder assembly (e.g., adjustable holder assembly 10) may include a laser alignment assembly (e.g., laser alignment assembly 54) configured to enable aligning of the adjustable holder assembly (e.g., adjustable holder assembly 10) with an external assembly (e.g., such as another piece of molding).

Adjustable holder assembly (e.g., adjustable holder assembly 10) may include a magnetic gripper assembly (e.g., magnetic gripper assembly 56) configured to removeably couple a hook (e.g., hook 58) of a tape measure (e.g., tape measure 60) to the adjustable holder assembly (e.g., adjustable holder assembly 10).

General:

In general, the various operations of method described herein may be accomplished using or may pertain to components or features of the various systems and/or apparatus with their respective components and subcomponents, described herein.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described example embodiments, and it will be understood by those skilled in the art that various changes and modifications to the previous descriptions may be made within the scope of the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An adjustable holder assembly configured for temporarily positioning an object on a surface comprising:
    a base assembly configured to be temporarily affixed to the surface;
    a support assembly configured to be slidably displaceable with respect to the base assembly and configured to support the object proximate the surface;
    an angle defining assembly configured to adjust the angular position of the object with respect to the surface; and
    an inclination indicator configured to indicate the level/plumb orientation of the adjustable holder assembly.

2. The adjustable holder assembly of claim 1 wherein the angle defining assembly is one or more of angularly and slidably displaceable with respect to the support assembly.

3. The adjustable holder assembly of claim 1 further comprising:
    an adjustment system configured to slidably displace the support assembly with respect to the base assembly.

4. The adjustable holder assembly of claim 3 wherein the adjustment system includes a micrometer-type adjustment system.

5. The adjustable holder assembly of claim 1 further comprising:
    an angle indicator configured to indicate the angular position of the object with respect to the surface.

6. The adjustable holder assembly of claim 5 wherein the angle indicator includes a protractor assembly.

7. The adjustable holder assembly of claim 5 wherein the angle indicator includes one or more detents at common angles.

8. The adjustable holder assembly of claim 1 wherein the inclination indicator includes a bubble level.

9. The adjustable holder assembly of claim 1 further comprising:
    a laser alignment assembly configured to enable aligning of the adjustable holder assembly with an external assembly.

10. The adjustable holder assembly of claim 1 further comprising:
    a magnetic gripper assembly configured to removeably couple a hook of a tape measure to the adjustable holder assembly.

11. The adjustable holder assembly of claim 1 wherein the adjustable holder assembly is constructed of a metallic material.

12. The adjustable holder assembly of claim 1 wherein the adjustable holder assembly is constructed of a plastic material.

13. The adjustable holder assembly of claim 1 wherein the object being temporarily positioned on the surface includes one of more of:
    a length of molding;
    a length of chair rail;
    a length of railing;
    a door assembly; and
    a window assembly.

14. An adjustable holder assembly configured for temporarily positioning an object on a surface comprising:
    a base assembly configured to be temporarily affixed to the surface;
    a support assembly configured to be slidably displaceable with respect to the base assembly and configured to support the object proximate the surface;
    an angle defining assembly configured to adjust the angular position of the object with respect to the surface, wherein the angle defining assembly is one or more of angularly and slidably displaceable with respect to the support assembly; and
    a laser alignment assembly configured to enable aligning of the adjustable holder assembly with an external assembly.

15. The adjustable holder assembly of claim 14 further comprising:

an adjustment system configured to slidably displace the support assembly with respect to the base assembly.

16. The adjustable holder assembly of claim 14 further comprising:
an angle indicator configured to indicate the angular position of the object with respect to the surface.

17. The adjustable holder assembly of claim 14 further comprising:
an inclination indicator configured to indicate the level/plumb orientation of the adjustable holder assembly.

18. The adjustable holder assembly of claim 14 further comprising:
a magnetic gripper assembly configured to removeably couple a hook of a tape measure to the adjustable holder assembly.

19. An adjustable holder assembly configured for temporarily positioning an object on a surface comprising:
a base assembly configured to be temporarily affixed to the surface;
a support assembly configured to be slidably displaceable with respect to the base assembly and configured to support the object proximate the surface;
an angle defining assembly configured to adjust the angular position of the object with respect to the surface, wherein the angle defining assembly is configured to be one or more of angularly and slidably displaceable with respect to the support assembly;
an adjustment system configured to slidably displace the support assembly with respect to the base assembly; and
an angle indicator configured to indicate the angular position of the object with respect to the surface, wherein the angle indicator includes a protractor assembly.

20. The adjustable holder assembly of claim 19 further comprising:
an inclination indicator configured to indicate the level/plumb orientation of the adjustable holder assembly.

21. The adjustable holder assembly of claim 19 further comprising:
a laser alignment assembly configured to enable aligning of the adjustable holder assembly with an external assembly.

22. The adjustable holder assembly of claim 19 further comprising:
a magnetic gripper assembly configured to removeably couple a hook of a tape measure to the adjustable holder assembly.

* * * * *